United States Patent [19] [11] 4,268,539
Nakayama et al. [45] May 19, 1981

[54] LIQUID COATING COMPOSITION FOR FORMING TRANSPARENT CONDUCTIVE FILMS AND A COATING PROCESS FOR USING SAID COMPOSITION

[75] Inventors: Muneo Nakayama, Tokyo; Toshihiro Nishimura, Kawasaki; Akira Hashimoto, Yokohama; Hisashi Nakane; Teruo Kimura, both of Kawasaki, all of Japan

[73] Assignee: Tokyo Denshi Kagaku Kabushiki Kaisha, Kanagawa, Japan

[21] Appl. No.: 960,652

[22] Filed: Nov. 14, 1978

[30] Foreign Application Priority Data

Nov. 24, 1977 [JP] Japan .............................. 52/140871

[51] Int. Cl.³ .................. B05D 5/12; C03C 17/23; B05D 3/02; B05D 1/02
[52] U.S. Cl. .................................... 427/108; 427/110; 427/126.2; 427/126.3; 106/287.18; 106/287.19; 252/518; 252/520; 252/521
[58] Field of Search ............. 427/108, 110, 226, 126.2, 427/126.3; 106/287.1, 287.19; 252/518, 520, 521

[56] References Cited
U.S. PATENT DOCUMENTS

| | | | |
|---|---|---|---|
| 2,617,745 | 11/1952 | Raymond | 427/108 |
| 2,651,585 | 9/1953 | Lytle | 427/110 |
| 2,694,761 | 11/1954 | Tarnopol | 427/110 |
| 2,849,339 | 8/1958 | Jaffe | 427/110 |
| 3,019,136 | 1/1962 | Auffenorde | 427/110 |
| 3,202,054 | 8/1965 | Mochel | 427/168 X |
| 3,400,288 | 9/1968 | Groth | 427/110 |
| 3,666,534 | 5/1972 | Groth | 427/110 |
| 3,925,050 | 12/1975 | Kushihashi et al. | 427/226 X |
| 4,000,346 | 12/1976 | Dowell | 427/110 |
| 4,129,434 | 12/1978 | Plumat et al. | 427/226 X |
| 4,147,556 | 4/1979 | Donley | 106/287.19 X |

*Primary Examiner*—James R. Hoffman
*Attorney, Agent, or Firm*—Armstrong, Nikaido, Marmelstein & Kubovcik

[57] ABSTRACT

A liquid coating composition for formation of a transparent conductive film, which comprises a solution of indium nitrate in a $\beta$-diketone or a mixture of a $\beta$-diketone and another organic solvent or a reaction product of indium nitrate with a $\beta$-diketone, an activator and an organic solvent other than a $\beta$-diketone, is disclosed.

When this coating composition is coated on a substrate and the coated substrate is heat-treated at a temperature higher than about 350° C., there can be obtained a transparent conductive film having excellent transparency, electrical conductivity and mechanical strength.

32 Claims, No Drawings

LIQUID COATING COMPOSITION FOR FORMING TRANSPARENT CONDUCTIVE FILMS AND A COATING PROCESS FOR USING SAID COMPOSITION

BACKGROUND OF THE INVENTION (1) Field of the Invention

The present invention relates to a liquid coating composition for the formation of a transparent conductive film and a process for forming a transparent conductive film on a substrate by using this liquid coating composition.

(2) Description of the Prior Art

Transparent conductive films have been broadly used for image pick-up tubes, de-icing materials for automobiles and airplanes, electric screens, electrodes of fluorescent indicator tubes, liquid crystal display devices and the like. These transparent conductive materials are required to have high transparency, good electrical conductivity and high mechanical strength. As materials providing transparent films meeting such requirements, there have been used materials composed mainly of metal oxides such as tin oxide and indium oxide. Indium oxide type materials are ordinarily inferior to tin oxide type materials with respect to thermal stability. However, since films formed from indium oxide type materials can easily be etched by a hydrochloric acid solution, these materials are frequently used for formation of transparent electrodes on which a delicate pattern should be formed, such as those of liquid crystal display devices. As glass substrates for formation of liquid crystal display devices, sodium glass sheets are mainly used for the purpose of reducing manufacturing costs. Since the melting point of sodium glass is low, it is necessary to adopt a temperature as low as possible for the coating operation, and, simultaneously, it is necessary to impart good electrical conductivity and high mechanical strength to the resulting films.

A vacuum evaporation coating process has heretofore been mainly adopted for formation of conductive films of indium oxide type materials. Although this process is satisfactory with respect to the quality of the resulting films, since the melting point of starting indium oxide is high, high-temperature heating is indispensable and the equipment is inevitably expensive and since the process is carried out batchwise, mass production is very difficult. Accordingly, attempts have been made to develop processes in which the coating operation can be facilitated and the foregoing disadvantages can be eliminated. For example, Japanese Patent Publication No. 3282/56 proposes a process comprising coating a substrate with a varnish comprising basic indium trifluoroacetate and heating the coated substrate at a temperature higher than 600° C. to form a conductive film of the indium oxyfluoride (InOF) type. In this process, no good conductivity can be obtained unless the heat treatment temperature is elevated to about 700° C. Accordingly, if a substrate having a low melting point, such as a sodium glass substrate, is employed, no good results can be obtained. Further, Japanese Patent Application Laid-Open Specification No. 37763/77 discloses a process comprising coating a substrate with a coating solution formed by dissolving an inorganic salt of indium in an organic solvent and heating the coated substrate. This process, however, is disadvantageous in that the used indium salt is precipitated in the formed film and the film becomes opaque. Moreover, Japanese Patent Application Laid-Open Specification No. 75991/76 discloses a process for forming conductive films free of such opaqueness, which comprises spray-coating a substrate with a liquid coating composition formed by adding hydrogen fluoride to a solution of indium chloride in water or an alcohol and heating the coated substrate at 420° C. to form an indium fluoride type film. Still further, Japanese Patent Application Laid-Open Specification No. 1497/77 teaches a process for forming an indium oxide type conductive film, which comprises coating a substrate with an organic solvent solution of indium naphthenate and diethyldiethoxyindium and exposing the coated substrate to a high temperature. In this process using organic indium compounds, a disadvantage that the film is rendered opaque by precipitation of crystals is eliminated, but at the sintering step, decomposition of the organic compounds occurs, and the resulting film is rendered porous and carbon is readily left in the film. As a result, the conductivity is reduced the mechanical strength is lowered and there is a further disadvantage in that the film is readily scratched or damaged.

BRIEF SUMMARY OF THE INVENTION

Research has been conducted with a view to overcoming the foregoing defects and disadvantages involved in conventional techniques. As a result of investigations made on the combined use of an indium salt and an organic compound, we previously developed a process in which indium chloride and a $\beta$-diketone are used in combination (though this process was not publicly reported). It was found, however, that in this process there is involved a risk that glass as a substrate is corroded by chlorine contained in indium chloride or at a heat treatment conducted at about 500° C., indium chloride is sublimated or evaporated, and it was also found that this process disadvantageous in that the mechanical strength of the resulting film is insufficient. Accordingly, it was confirmed that this process cannot be commercialized.

We furthered our research and found that when indium nitrate is employed, even if the heat treatment is conducted at a relatively low temperature, there can be obtained a conductive film having a high transparency, good electrical conductivity and high mechanical strength. We have now completed the present invention based on this finding.

More specifically, in accordance with one fundamental aspect of the present invention, there is provided a liquid coating composition for formation of a transparent conductive film, which comprises a solution of indium nitrate in a $\beta$-diketone or a mixture of a $\beta$-diketone and another organic solvent or a reaction product of indium nitrate with a $\beta$-diketone, an activator and an organic solvent other than a $\beta$-diketone.

In accordance with another fundamental aspect of the present invention, there is provided a process for formation of transparent conductive films on substrates, which comprises coating a substrate with a liquid coating composition comprising a solution of indium nitrate in a $\beta$-diketone or a mixture of a $\beta$-diketone and another organic solvent or a reaction product of indium nitrate with a $\beta$-diketone, an activator and an organic solvent other than a $\beta$-diketone, and heat-treating the coated substrate at a temperature higher than about 350° C.

DETAILED DESCRIPTION OF THE PREFERRED EMBODIMENTS

Indium nitrate that is used in the present invention is insoluble in an ordinary organic solvent, but it is very soluble in β-diketones and it readily reacts with β-diketones at room temperature. As the reaction advances between indium nitrate and a β-diketone, the color of the solution changes. Namely, the solution is first colorless and transparent, but as the reaction advances, it becomes yellow, yellowish brown and brown. When the reaction is conducted for a long time, the solution becomes blackish brown color. If the β-diketone is used in an amount of about 2 to about 3 moles per mole of indium nitrate, the reaction is accelerated. This reaction can take place even at room temperature and the reaction rate can be accelerated by heating. Accordingly, from the viewpoint of facilitating the operation, it is preferred that the solution be heated at a temperature of from about 40° to about 100° C. In this case, the reaction advances to a desirable degree in about 1 to about 8 hours. It is construed that the solution which has thus been reacted contains a complex compound formed from indium nitrate and the β-diketone and the unreacted β-diketone. The degree of advance of the reaction can be controlled and determined by colorimetry using an infrared absorption spectrum or color analyzer or by ultraviolet absorption analysis. When the reaction advances to a desirable degree, the temperature is lowered to room temperature and according to need, an organic solvent other than the β-diketone, preferably an organic solvent having a hydroxyl group, is added to the solution to stop the reaction.

In the present invention, a brownish solution of a reaction product of indium nitrate and a β-diketone, in which the above reaction is slightly advanced, can also be used. In this case, a film having highly improved electrical conductivity and mechanical strength can be obtained. However, if a dark brown solution is employed, which results from the reaction having been conducted for a long period of time, the amount of the complex compound present in the solution is increased causing decomposition of the organic substance during the heat-treating step to produce the coated substrate. Accordingly, the resulting film often becomes porous and there is observed a disadvantage that the mechanical strength is reduced.

When the β-diketone used is solid at room temperature, it is necessary to dissolve the β-diketone in another organic solvent and incorporate indium nitrate into the resulting solution.

The β-diketone that is used in the present invention is a compound represented by the following general formula (I):

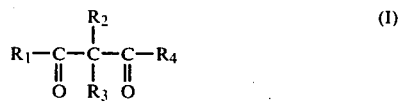

(I)

wherein $R_1$ and $R_2$, $R_3$ and $R_4$, which may be the same or different, are a hydrogen atom, an alkyl, an alkoxy, an aryl or a heterocyclic group, and at least one of $R_1$, $R_2$, $R_3$ and $R_4$ being not a hydrogen atom may be substituted by a halogen atom. It is also possible that the structure of formula I be such that $R_1$ and $R_4$, which may be the same or different, are an alkyl group, an alkoxy group, an aryl group, or a heterocyclic group, and at least one of $R_1$ and $R_4$ may be substituted by a halogen atom, and $R_2$ and $R_3$, which may be the same or different, are a hydrogen atom, an alkyl group, an alkoxy group, an aryl group or a heterocyclic group and, at least one of $R_2$ and $R_3$, being not a hydrogen atom, may be substituted by a halogen atom.

As the β-diketone represented by the above general formula (I), there are preferably employed acetylacetone, C-methylacetylacetone [CH$_3$COCH(CH$_3$)COCH$_3$], ethyl acetoacetate, acetylmethylethylketone, trifluoroacetylacetone, diethyl malonate, benzoylacetone, dibenzoylmethane, benzoyltrifluoroacetone, furoylacetone, 2-furoylbenzoylmethane, 2-thenoylacetone, 2-thenoyltrifluoroacetone, malonaldehyde, 2-thenoylbenzoylmethane, bis(thenoyl)methane, 2-furoyltrifluoroacetone, hexafluoroacetylacetone, β-naphthoyltrifluoroacetone and mixtures thereof.

By the term "activator" is meant a component incorporated in a minute amount so as to impart a high electrical conductivity to the resulting film. For example, compounds of tin, titanium and zinc can be mentioned as effective activators. Tin compounds such as tin halides, tin nitrate and tin acetate are especially preferred. Either divalent tin compounds or tetravalent tin compounds can be effectively used. As specific examples of the tin halide, there can be mentioned stannous chloride, stannic chloride, stannous bromide, stannic bromide, stannous iodide and stannic iodide.

β-Diketones that are used in the present invention are ordinarily poor in the wetting properties with regard to the substrate. Some β-diketones are solid at room temperature. In order to improve the wetting property of the coating composition of the present invention so that it can be uniformly coated on the substrate, or in order to mix indium nitrate homogeneously with the β-diketone, an organic solvent is used for the coating composition of the present invention. Any of the organic solvents that are compatible with the reaction solution and can be coated on the substrate without repelling may be used in the present invention. For example, there can be used alcohols, esters, ethers, ketones and mixtures thereof. As suitable examples of the alcohol, there can be mentioned methyl alcohol, ethyl alcohol, propyl alcohol, butyl alcohol and ethylene glycol. As suitable examples of ethers, there can be mentioned ethyl ether, isopropyl ether, dioxane and tetrahydrofuran. As suitable examples of the ester, there can be mentioned methyl acetate, ethyl acetate, propyl acetate and butyl acetate, and as suitable examples of the ketone, there can be mentioned methylethylketone, methylbutylketone and cyclohexanone.

The mixing ratios of the ingredients of the liquid coating composition of the present invention will now be described. It is ordinarily preferred that the total solid content of unreacted indium nitrate and the indium nitrate-β-diketone complex be about from 2 to about 20% by weight based on the total composition. Further, it is preferred that the concentration of the activator be from about 1 to about 30% by weight, particularly from about 3 to about 15% by weight based on indium (calculated as IN$_2$O$_3$).

The liquid coating composition of the present invention can be prepared according to various embodiments in addition to the above-mentioned method. For example, there can be mentioned a method comprising adding a necessary amount of indium nitrate to an organic solvent solution containing the activator and a necessary amount of the β-diketone, a method comprising adding a necessary amount of the β-diketone to an organic solvent solution containing indium nitrate and the activator, and similar methods.

The process for formation of a transparent conductive film on a substrate will now be described.

As the substrate that can be used in the present invention, there can be mentioned, for example, glass, ceramics and mica. Any materials that have heretofore been used as substrates for formation of transparent conductive films can be used in the present invention. Since a relatively low temperature can be adopted for the heat treatment when the liquid coating composition of the present invention is used, it is possible to use a heat-resistant plastic material, for example, a polyimide, as the substrate as well as the foregoing conventional materials.

Any known coating methods can be adopted for application of the liquid coating composition of the present invention. For example, there can be adopted a spinner coating method, a spray coating method, a brush coating method and a dipping draw-out method. The present invention is advantageous in that the size of the substrate is not particularly critical. When scores of substrates having a size larger than that of 20 cm×20 cm are coated at one time, the dipping draw-out method is preferably employed. The amount of the liquid coating composition employed is varied depending on the concentration of the coating composition and the desired thickness, but, in general, the liquid coating composition is coated in such an amount that the thickness of the resulting film is in the range of from several hundred angstroms to several thousand angstroms.

After coating the substrate with the liquid coating composition, the heat treatment is carried out. The heating atmosphere is not particularly critical and the heat treatment may be conducted in oxygen or air. However, in order to obtain a film having a further improved electrical conductivity, it is preferred that the heat treatment be carried out in an atmosphere of an inert gas such as nitrogen. The present invention is advantageous over conventional processes in that a conductive film can be formed at a relatively low temperature, for example, about 350° C. However, as the heat treatment temperature becomes higher, the conductivity of the resulting film is improved. Accordingly, it is preferred to carry out the heat treatment at a temperature as high as possible within a range limited by the heat resistance of the substrate used. A longer heat treatment time is preferred, but from the viewpoint of facilitating the operation, it is preferred to conduct the heat treatment for about 10 to about 60 minutes at a temperature in the range of from about 350° C. to about 1100° C.

When the coating is carried out by using the liquid coating composition of the present invention, according to the above-mentioned process of the present invention, a transparent, conductive and continuous film free of pin holes, having a thickness of from about 0.03 to about 0.3 micron, can be formed on various substrates. Since such film can be prepared very easily at low cost, the present invention is very advantageous from the commercial viewpoint. The present invention is especially characterized in that a transparent conductive film having good quality can be formed, even if the treatment temperature is much lower than the treatment temperature adopted in the conventional process, the present invention is especially advantageous in the field where the use of sodium glass as the substrate is indispensable. Accordingly, the present invention makes various valuable contributions to the art.

The present invention will now be described by reference to the following Examples that by no means limit the scope of the invention.

EXAMPLE 1

In 50 g of acetylacetone was dissolved 50 g of indium nitrate, and the reaction was conducted for 4 hours under heating at 70° C. The solution which had been colorless and transparent was converted to a yellowish brown solution. The temperature was lowered to room temperature, and 400 g of ethyl alcohol was added to the reacted solution, and 5 g of stannic chloride was added thereto to obtain a coating solution. The coating solution was applied to a smooth sodium glass sheet having a thickness of 1 mm, which was usually used as a window pane, and the coating operation was carried out by using a spinner rotated at a rate of 3,000 rpm.

The so prepared samples were divided into groups A and B and were subjected to the following treatment.

[Group A]

The coated glass sheet was placed in a nitrogen atmosphere and maintained at a temperature of 500° C. for 30 minutes to form a first coating. The above-mentioned coating solution was coated on the first coating again in the same manner as described above, and the above heat treatment was carried out again to form a second coating. Further, a third coating was formed on this second coating in the same manner as described above.

Properties of the so obtained coatings are shown in Table 1. Tests for each coating were conducted prior to applying the next coating, i.e. the first coating was formed and tested prior to applying the second coating, etc.

TABLE 1

|  | First Coating | Second Coating | Second Coating |
|---|---|---|---|
| Transmittance (wave length = 400–700Ωm) | 85% | 80% | 85% |
| Sheet Resistance (KΩ/□), i.e. kiloohm/square | 1.0% | 0.6% | 0.2% |
| Thickness (A) | 400 | 700 | 1000 |
| Etching Rate (18% hydrochloric acid solution, 45° C.) | 15 seconds | 25 seconds | 35 seconds |
| Scratch Strength (g) | 50 | 50 | 50 |

Note
The scratch strength was determined by using a cross-cut tester manufactured by Kamishima Seisakusho.

For comparison, the scratch strength of an indium oxide film formed by the vacuum evaporation coating was measured. It was found that the scratch strength of this film was 45 g.

The above described heat treatment was repeated again in the same manner except that the temperature was changed as shown in Table 2, and the sheet resistance of the first coating was measured to obtain results shown in Table 2, from which it will readily be understood that elevation of the heat treatment temperature results in reduction of the sheet resistance.

TABLE 2

| Heat Treatment Temperature (°C.) | Sheet Resistance (KΩ/□) |
|---|---|
| 350 | 100 |
| 400 | 15 |

TABLE 2-continued

| Heat Treatment Temperature (°C.) | Sheet Resistance (KΩ/□) |
| --- | --- |
| 450 | 4 |
| 475 | 1.5 |
| 500 | 1.0 |
| 600* | 0.5 |

Note
*a borosilicate glass sheet was used instead of the sodium glass sheet

[Group B]

The coated glass sheet was heat-treated at 500° C. for 30 minutes in an oxygen atmosphere.

Properties of the resulting coatings were not different from those of the coatings obtained in the heat treatment of the group A, except the sheet resistance due to the use of an oxygen atmosphere. Namely, the sheet resistances of the coatings obtained in the group B are as follows:

First coating: 2.0 KΩ/□
Second coating: 1.3 KΩ/□
Third coating: 0.5 KΩ/□

The heat treatment temperature was changed as indicated in Table 3, and the sheet resistance of the first coating as described above, was measured to obtain results shown in Table 3.

TABLE 3

| Heat Treatment Temperature (°C.) | Sheet Resistance (KΩ/□) |
| --- | --- |
| 350 | 200 |
| 400 | 30 |
| 450 | 8 |
| 475 | 3 |
| 500 | 2 |
| 600* | 1 |

Note
*a borosilicate glass sheet was used instead of the sodium glass sheet

EXAMPLE 2

In 50 g of ethyl acetoacetate was dissolved 50 g of indium nitrate, and the reaction was conducted at 25° C. for 8 hours. The color of the solution was changed to yellowish brown. Then, 250 g of methyl alcohol, 100 g of acetone and 50 g of ethyl acetate were added to the reacted solution, and 5 g of tin nitrate was further added thereto to form a coating solution. A borosilicate glass (Pyrex glass) sheet having a thickness of 1 mm was dipped in the coating solution and drawn up at a rate of 30 cm/min to form the coating. The coated glass sheet was heat-treated at 600° C. for 30 minutes in a nitrogen atmosphere to obtain a coating film having the following properties:

Transmittance (wave length=400–700 nm): 87%
Sheet resistance: 0.5 KΩ/□
Etching rate (18% hydrochloric acid, 45° C.): 18 seconds
Thickness: 395 Å
Scratch strength: 100 g

EXAMPLE 3

In 50 g of trifluoroacetylacetone was dissolved 50 g of indium nitrate, and the reaction was conducted at 90° C. for 1 hour. The color of the solution changed to yellowish brown. The temperature was lowered to room temperature, and 400 g of n-propyl alcohol was added to the reacted solution and 5 g of tin bromide was further added thereto to form a coating solution. The coating solution was applied to a ceramic substrate having a thickness of 1.5 mm and coating was conducted by using a spinner rotated at 3,000 rpm. The coated substrate was then heat-treated at 500° C. for 1 hour to obtain a coating film having the following properties:

|  | First Coating | Second Coating |
| --- | --- | --- |
| Sheet resistance | 20 KΩ/□ | 2.0 KΩ/□ |
| Etching rate (18% hydrochloric acid, 45° C. | 10 seconds |  |
| Thickness | 400 Å |  |
| Scratch strength | 30 g |  |

When the heat treatment was carried out at 1000° C. for 1 hour, the sheet resistance of the resulting coating film was reduced to 1 KΩ/□.

EXAMPLE 4

In 50 g of acetone were dissolved 50 g of indium nitrate and 50 g of benzoylacetone, and the solution was treated in the same manner as described in Example 1 to obtain a coating solution. The coating solution was applied to a polyimide film (Capton film manufactured by du Pont) having a thickness of 0.2 mm and the coating operation was carried out by using a spinner rotated at 3000 rpm. The coated substrate was heat-treated at 400° C. for 30 minutes in a nitrogen atmosphere to obtain a coating film having a sheet resistance of 40 KΩ/□.

What we claim is:

1. A liquid coating composition for forming a transparent conductive film, which comprises a solution of:
   (a) an incomplete reaction product of indium nitrate with a β-diketone in which the reaction may be allowed to proceed until a yellowish, yellow, brownish or brown color is obtained;
   (b) an activator for imparting a high electrical conductivity to said transparent conductive film; and
   (c) an organic solvent other than a β-diketone.

2. The liquid coating composition as set forth in claim 1 wherein the amount of the β-diketone is from about 2 to about 3 moles per mole of indium nitrate.

3. The liquid coating composition as set forth in claim 1 wherein the β-diketone is a compound represented by the following general formula:

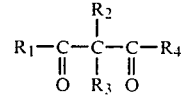

wherein $R_1$, $R_2$, $R_3$ and $R_4$, which may be the same or different, are a hydrogen atom, an alkyl group, an alkoxy group, an aryl group or a heterocyclic group, and at least one of $R_1$, $R_2$, $R_3$ and $R_4$, being not a hydrogen atom, may be substituted by a halogen atom.

4. The liquid coating composition as set forth in claim 3 wherein the β-diketone is a compound represented by the following general formula:

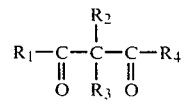

wherein $R_1$ and $R_4$, which may be the same or different, are alkyl group, an alkoxy group, an aryl group or a heterocyclic group, and at least one of $R_1$ and $R_4$ may be substituted by a halogen atom, and wherein $R_2$ and $R_3$, which may be the same or different, are a hydrogen atom, an alkyl group, an alkoxy group, an aryl group or a heterocyclic group, and at least one of $R_2$ and $R_3$, being not a hydrogen atom, may be substituted by a halogen atom.

5. The liquid coating composition as set forth in claim 4 wherein the β-diketone is a member selected from the group consisting of acetylacetone, $CH_3COCH(CH_3)COCH_3$, ethyl acetoacetate acetylmethylethylketone, trifluoroacetylacetone, diethyl malonate, benzoylacetone, dibenzoylmethane, benzoyltrifluoroacetone, furoylacetone, 2-furoylbenzoylmethane, 2-thenoylacetone, 2-thenoyltrifluoroacetone, malonaldehyde, 2-thenoylbenzoylmethane, bis(thenoyl)methane, 2-furoyltrifluoroacetone, hexafluoroacetylacetone, β-naphthoyitrifluoroacetone and mixtures thereof.

6. The liquid coating composition as set forth in claim 1 wherein the activator is a compound of tin, titanium or zinc.

7. The liquid coating composition as set forth in claim 6 wherein the activator is a tin nitrate or tin acetate.

8. The liquid coating composition as set forth in claim 1 wherein the organic solvent other than the β-diketone is a member selected from the group consisting of alcohols, esters, ethers, ketones and mixtures thereof.

9. The liquid coating composition as set forth in claim 8 wherein the organic solvent is a member selected from the group consisting of methyl alcohol, ethyl alcohol, propyl alcohol, butyl alcohol, ethylene glycol, ethyl ether, isopropyl ether, dioxane, tetrahydrofuran, methyl acetate, ethyl acetate, propyl acetate, butyl acetate, acetone, methylethylketone, methylbutylketone, cyclohexanone and mixtures thereof.

10. The liquid coating composition as set forth in claim 1 wherein the content of the total solids of the reaction product of indium nitrate with the β-diketone is from about 2 to about 20% by weight.

11. The liquid coating composition as set forth in claim 1 wherein the concentration of the activator is from about 1 to about 30% by weight based on the indium component as $In_2O_3$.

12. The liquid coating composition as set forth in claim 11 wherein the concentration of the activator is from about 3 to about 15% by weight based on the indium component as $In_2O_3$.

13. A process for forming a transparent conductive film on a substrate at room temperature, which comprises coating a substrate with liquid coating composition comprising a solution of:
(a) an incomplete reaction product of indium nitrate with a β-diketone at room temperature in which the reaction may be allowed to proceed until a yellowish, yellow, brownish or brown color is obtained;
(b) an activator for imparting a high electrical conductivity to said transparent conductive film; and
(c) an organic solvent other than a β-diketone; and wherein said process includes a step of heat treating the coated substrate at a temperature higher than about 350° C.

14. The coating process according to claim 13 wherein the substrate is composed of glass, ceramics, mica or heat-resistant plastics.

15. The coating process according to claim 13 wherein the coating operation is carried out according to a spinner coating method, a spray coating method, a brush coating method or a dipping draw-out method.

16. The coating process according to claim 13 wherein the heat treatment is carried out in oxygen or air.

17. The coating process according to claim 13 wherein the heat treatment is carried out in an atmosphere of an inert gas.

18. The coating process according to claim 18 wherein the inert gas is nitrogen.

19. The coating process according to claim 13 wherein the heat treatment is conducted for a time period of from about 10 to about 60 minutes.

20. A coating process according to claim 13 wherein the heat treatment is conducted at a temperature of from about 350° C. to about 1100° C.

21. The coating process according to claim 13 wherein the liquid coating composition is coated on the substrate in such an amount that the resulting coating film has a thickness of from about 0.03 to about 0.3 micron.

22. The coating process according to claim 13 wherein the amount of the β-diketone is from about 2 to about 3 moles per mole of indium nitrate.

23. The coating process according to claim 13 wherein the β-diketone is a compound represented by the following general formula:

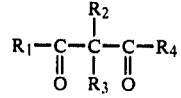

wherein $R_1$, $R_2$, $R_3$ and $R_4$, which may be the same or different, are a hydrogen atom, an alkyl group, an alkoxy group, an aryl group or a heterocyclic group, and at least one of $R_1$, $R_2$, $R_3$ and $R_4$, being not a hydrogen atom, may be substituted by a halogen atom.

24. The coating process according to claim 23 wherein the β-diketone is a compound represented by the following general formula:

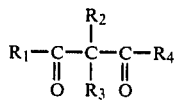

wherein $R_1$ and $R_4$, which may be the same or different, are an alkyl group, an alkoxy group, an aryl group or a heterocyclic group, and at least one of $R_1$ and $R_4$ may be substituted by a halogen atom, and wherein $R_2$ and $R_3$, which may be the same or different, are a hydrogen atom, an alkyl group, an alkoxy group, an aryl group or a heterocyclic group, and at least one of $R_2$ and $R_3$, being not a hydrogen atom, may be substituted by a halogen atom.

25. The coating process according to claim 23 wherein the β-diketone is a member selected from the group consisting of acetylacetone, $CH_3COCH(CH_3)COCH_3$, ethyl acetoacetate, acetylmethylethylketone, trifluoroacetylacetone, diethyl malonate, benzoylacetone, dibenzoylmethane, benzoyltrifluoroacetone, furoylacetone, 2-furoylbenzoylmethane, 2-thenoylacetone, 2-thenoyltrifluoroacetone, malonaldehyde, 2-thenoylbenzoylmethane, bis(thenoyl)methane, 2-furoyltrifluoroacetone, β-naphthoyltrifluoroacetone and mixtures thereof.

26. The coating process according to claim 13 wherein the activator is a compound of tin, titanium or zinc.

27. The coating process according to claim 26 wherein the activator is a tin nitrate or tin acetate.

28. The coating process according to claim 13 wherein the organic solvent other than the β-diketone is a member selected from the group consisting of alcohols, esters, ethers, ketones and mixtures thereof.

29. The coating process according to claim 28 wherein the organic solvent is a member selected from the group consisting of methyl alcohol, ethyl alcohol, propyl alcohol, butyl alcohol, ethylene glycol, ethyl ether, isopropyl ether, dioxane, tetrahydrofuran, methyl acetate, ethyl acetate, propyl acetate, butyl acetate, acetone, methylethylketone, methylbutylketone, cyclohexanone and mixtures thereof.

30. The coating process according to claim 13 wherein the content of the total solids of the reaction product of indium nitrate with the β-diketone is from about 2 to about 20% by weight.

31. The coating process according to claim 13 wherein the concentration of the activator is from about 1 to about 30% by weight based on the indium component as $In_2O_3$.

32. The coating process according to claim 31 wherein the concentration of the activator is from about 3 to about 14% by weight based on the indium component as $In_2O_3$.

* * * * *

UNITED STATES PATENT AND TRADEMARK OFFICE
CERTIFICATE OF CORRECTION

PATENT NO. : 4,268,539
DATED : May 19, 1981
INVENTOR(S) : MUNEO NAKAYAMA ET AL

It is certified that error appears in the above-identified patent and that said Letters Patent are hereby corrected as shown below:

Column 4, line 62, change "$IN_2O_3$" to --$In_2O_3$--.

Column 6, Table 1, change "Thickness (A)" to --Thickness (Å)--.

Column 8, Table, change "400 A" to --400 Å--.

Column 10, Claim 18, line 1, change "claim 18" to --claim 17--.

Column 12, Claim 32, line 3, change "14%" to --15%--.

Signed and Sealed this

Thirteenth Day of October 1981

[SEAL]

Attest:

Attesting Officer

GERALD J. MOSSINGHOFF

Commissioner of Patents and Trademarks